US012801615B2

(12) United States Patent
Thomas et al.

(10) Patent No.: US 12,801,615 B2
(45) Date of Patent: Nov. 17, 2026

(54) RUNTIME USER EXPERIENCE ROUTING

(71) Applicant: INTUIT INC., Mountain View, CA (US)

(72) Inventors: Vijay Thomas, Mountain View, CA (US); Anunay Amar, Edmonton (CA); Lilung Liu, Mountain View, CA (US); Venkatesan Murugesan, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/000,192

(22) Filed: Dec. 23, 2024

(65) Prior Publication Data

US 2026/0178593 A1 Jun. 25, 2026

(51) Int. Cl.
*G06F 16/2457* (2019.01)
*G06F 16/2452* (2019.01)
*G06F 16/248* (2019.01)

(52) U.S. Cl.
CPC .. *G06F 16/24578* (2019.01); *G06F 16/24522* (2019.01); *G06F 16/248* (2019.01)

(58) Field of Classification Search
None
See application file for complete search history.

(56) References Cited

U.S. PATENT DOCUMENTS 10,229,106 B2 * 3/2019 Marcus ................. G06F 40/211
12,079,570 B1 * 9/2024 Mondlock ............... G06F 40/20
12,639,319 B1 * 5/2026 Chagas ............. G06F 16/24578
2011/0197148 A1 * 8/2011 Rhee ...................... G06Q 10/00 715/753
2015/0032441 A1 * 1/2015 Marcus ................. G06F 40/211 704/9
2015/0347420 A1 * 12/2015 Glover .................... G06F 16/90 707/728
2025/0284888 A1 * 9/2025 Khullar ................ G06F 40/205
(Continued)

OTHER PUBLICATIONS

Match-Prompt: Improving Multi-task Generalization Ability for Neural Text Matching via Prompt Learning (Year: 2022).*
(Continued)

*Primary Examiner* — Kim T Nguyen
(74) *Attorney, Agent, or Firm* — DLA PIPER LLP US

(57) ABSTRACT

At least one processor may receive a string input through a user interface (UI) including a request to perform a computing function. The at least one processor may determine a query responsive to the request and query at least one database using the query, receiving a plurality of descriptions of a plurality of potentially matching applications and respective similarity scores for each respective one of the plurality of potentially matching applications in response. The at least one processor may prompt a generative artificial intelligence (GenAI) with a prompt including the plurality of descriptions and respective similarity scores and receive a response to the prompt from the GenAI indicating a most likely matching application from among the plurality of potentially matching applications. The at least one processor may launch the most likely matching application in the UI, including loading context data from the UI into the most likely matching application.

18 Claims, 5 Drawing Sheets

(56) References Cited

U.S. PATENT DOCUMENTS

| | | | | |
|---|---|---|---|---|
| 2026/0120869 | A1 * | 4/2026 | Bajpai | G16H 50/20 |
| 2026/0161698 | A1 * | 6/2026 | Kedia | G06F 16/438 |
| 2026/0178593 | A1 * | 6/2026 | Thomas | G06F 16/24578 |
| 2026/0195331 | A1 * | 7/2026 | Tiwana | G06N 20/00 |
| 2026/0195644 | A1 * | 7/2026 | Simon | G06N 20/00 |

OTHER PUBLICATIONS

Matching Exemplar as Next Sentence Prediction (MeNSP): Zero-shot Prompt Learning for Automatic Scoring in Science Edu (Year: 2023).*

* cited by examiner

RUNTIME USER EXPERIENCE ROUTING

BACKGROUND

There are many cases where a user working within a user interface (UI) of a product or service requires certain functions or features, but does not know how to navigate the UI to find those functions or features. Likewise, there are many cases where a user is working with one product or service and needs to switch to another product or service to complete their task(s).

BRIEF DESCRIPTIONS OF THE DRAWINGS

DETAILED DESCRIPTION OF SEVERAL EMBODIMENTS

Systems and methods described herein can automatically identify and launch applications and/or other components for users. For example, embodiments described herein can determine a user's needs based on the user's input and/or context data such as the user's conversation history and experiences, using semantic and lexical search. A user input may be passed onto a backend service, which can use generative artificial intelligence (GenAI) plugins, large language models (LLMs), and/or other processing techniques to translate the user experience into applications, plugins, and/or routes to instantiate. The correct application, plugin, and/or route may be passed onto the front end for a seamless user experience. UI and/or user context may be preserved as the user switches between applications, plugins, and/or routes.

Figure 1:
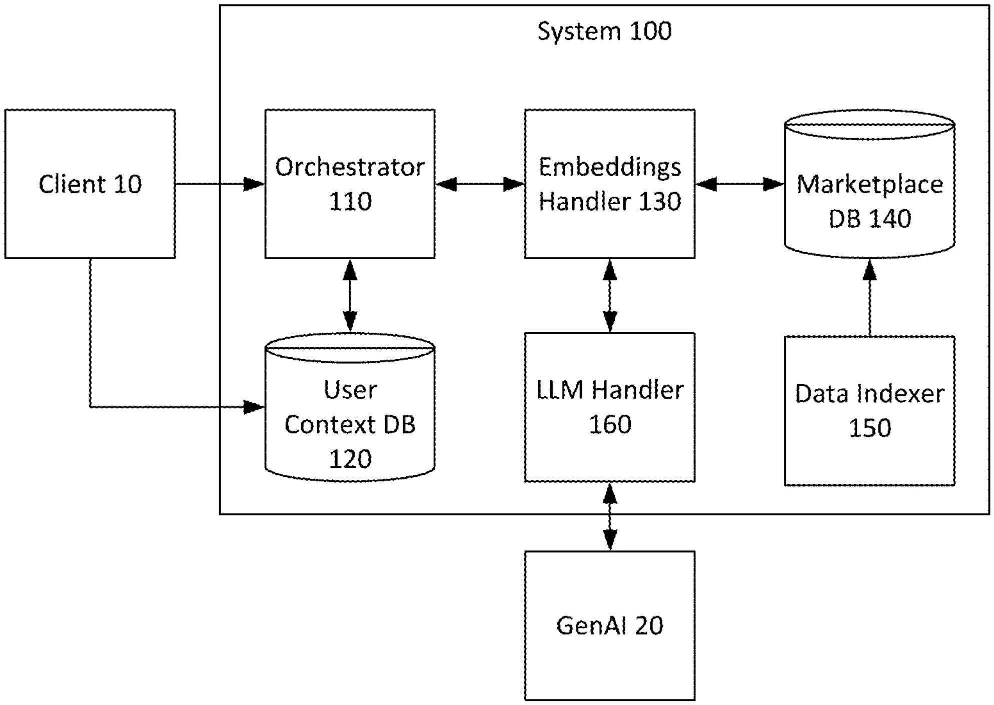
FIG. 1 shows an example runtime user experience routing system according to some embodiments of the disclosure.

FIG. 1 shows an example runtime user experience routing system 100 according to some embodiments of the disclosure. System 100 may include orchestrator 110, user context database (DB) 120, embeddings handler 130, marketplace DB 140, data indexer 150, and/or LLM handler 160, the features and functions of which are described in detail below. As described in detail below, system 100 may interact with client 10 to obtain and process user prompts and provide user experience access and/or with GenAI 20 to refine user experience predictions, for example.

Illustrated components may include a variety of hardware, firmware, and/or software components that interact with one another. Some components shown in FIG. 1 may communicate with one another using networks. For example, client 10 may access system 100 through one or more networks (e.g., the Internet, an intranet, and/or one or more networks that provide a cloud environment) and/or system 100 may communicate with GenAI 20 through the one or more networks. In some embodiments, elements of system 100 may communicate with one another through the one or more networks. Each component may be implemented by one or more computers (e.g., as described below with respect to FIG. 5).

The elements of system 100 are described in greater detail below with respect to FIGS. 2-4, but in general, system 100 can determine an appropriate user experience based on user input and/or context, in conjunction with GenAI 20 in at least some embodiments. By performing this processing, system 100 can automatically identify, configure, and launch applications and/or components thereof within a UI presented by client 10.

Elements illustrated in FIG. 1 (e.g., system 100 (including orchestrator 110, user context DB 120, embeddings handler 130, marketplace DB 140, data indexer 150, and/or LLM handler 160), client 10, and GenAI 20) are each depicted as single blocks for ease of illustration, but those of ordinary skill in the art will appreciate that these may be embodied in different forms for different implementations. For example, while separate modules of system 100 are depicted separately, any combination of these elements may be part of a combined hardware, firmware, and/or software element. Moreover, while the modules are depicted as parts of a single system 100 element, any combination of these elements may be distributed among multiple logical and/or physical locations. Also, while one client 10, one GenAI 20, and one system 100 with one orchestrator 110, one user context DB 120, one embeddings handler 130, one marketplace DB 140, one data indexer 150, and one LLM handler 160 are illustrated, this is for clarity only, and multiples of any of the above elements may be present. In practice, there may be single instances or multiples of any of the illustrated elements, and/or these elements may be combined or co-located. For example, system 100 may interact with multiple clients 10 and/or GenAIs 20.

In the following descriptions of how the illustrated components function, several examples are presented. However, those of ordinary skill in the art will appreciate that these examples are merely for illustration, and the disclosed embodiments are extendable to other contexts and/or scenarios.

Figure 2:
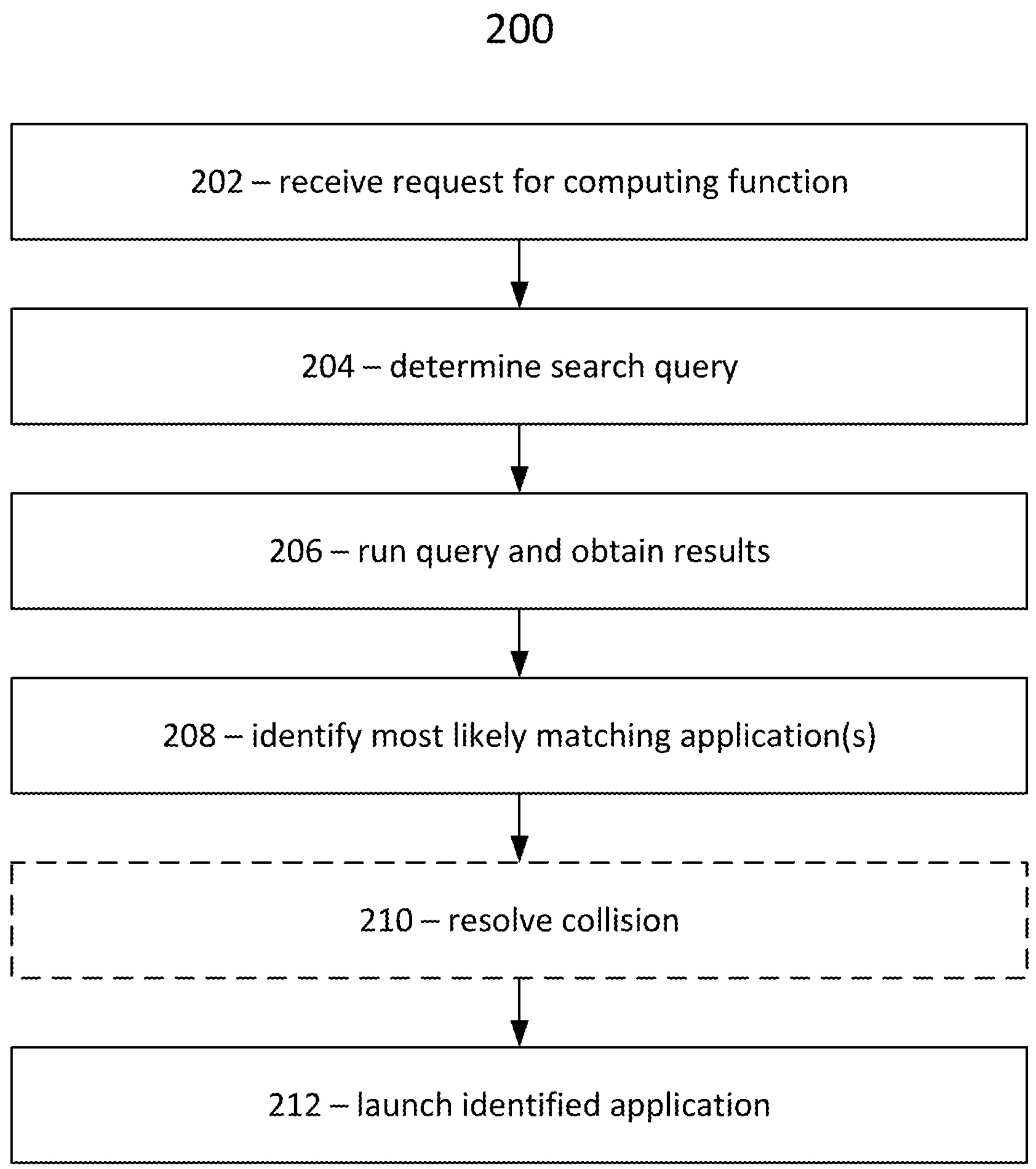
FIG. 2 shows an example runtime user experience routing process according to some embodiments of the disclosure.

FIG. 2 shows an example runtime user experience routing process 200 according to some embodiments of the disclosure. For example, system 100 can perform process 200 when a user of client 10 enters requests a computing function using a UI presented by client 10. System 100 can process the request as follows and provide the requested function.

At 202, system 100 can receive a request for a computing function. For example, a user can enter a string input through a UI presented by client 10, or the user can enter an input and that input can be converted to a string input using any known or proprietary technique. The string input can include a request to perform a computing function. As non-limiting examples, the string input can include a request for general or specific tax advice, general or specific accounting services, or other functionality. The string input can be in plain language (e.g., "I want to file my taxes."). Orchestrator 110 can receive the string input from client 10.

In some embodiments, orchestrator 110 can add context data to the string input. Client 10 can provide context data to orchestrator 110 and/or orchestrator 110 can retrieve context data from user context DB 120. For example, the user may be logged in to a computing platform including a UI, and the computing platform may maintain context data associated with the user. The context data can include, for example, user profile data, user activity history within the UI, a current state of the UI, and/or other information.

At 204, system 100 can determine a search query responsive to the request. For example, orchestrator 110 may pass the string input to embeddings handler 130, which in turn may query marketplace DB 140. Marketplace DB 140 may be a vector DB or other element storing data in a structured manner wherein formatting search queries may be useful for obtaining relevant results. Accordingly, embeddings handler 130 can determine at least one vector embedding of at least a portion of the string input to form at least a portion of the search query.

At 206, system 100 can run the query and obtain results. For example, embeddings handler 130 can query marketplace DB 140 and obtain query results. The search query can comprise a natural language description of the computing function, which may be in natural language string form or encoded as a vector embedding as described above. Where embeddings handler 130 determined at least one vector embedding as all or part of a search query at 204, embeddings handler 130 can query marketplace DB 140 using the search query including the vector embedding(s), for example.

Marketplace DB 140 can return results that include a plurality of descriptions of a plurality of potentially matching applications and respective similarity scores for each respective one of the plurality of potentially matching applications in response to the querying. Each respective one of the plurality of descriptions can include or otherwise describe at least one feature of the respective potentially matching application. Returned results can be in vector or string format, and in the former case, embeddings handler 130 can convert the vector data to string data in some embodiments. That is, embeddings handler 130 may determine at least one string including the plurality of potentially matching applications and respective similarity scores derived from at least one vector returned by the at least one vector database in response to the querying.

At 208, system 100 can identify most likely matching application(s) from the results. For example, embeddings handler 130 can build a prompt including the plurality of descriptions and respective similarity scores received at 206. The prompt can ask GenAI 20 to identify a most likely matching application from the plurality of descriptions and respective similarity scores. LLM handler 160 can send the prompt to GenAI 20 and receive a response to the prompt from GenAI 20.

The response can indicate a most likely matching application from among the plurality of potentially matching applications. For example, the response can rank and score the applications for similarity to the user request, with the highest-scored application being the highest ranked and most likely matching application. In some cases, the response can indicate a collision, where two or more applications may be the most likely matching application due to having similarities to the user request that are closer than some threshold similarity level.

At 210, system 100 can resolve a collision if one is present. For example, the response received at 208 can include a most likely matching application and a second most likely matching application from among the plurality of potentially matching applications, where the score of each is close enough to be considered a collision. In this case, orchestrator 110 can cause client 10 to present an interface within the UI indicating the most likely matching application and the second most likely matching application. The user may be able to select one of the applications to load, and client 10 can send the selection to orchestrator 110. Processing may continue using the selection as the most likely matching application (e.g., the launching described below can be performed in response to the selection and can include launching the selected application).

At 212, system 100 can launch the identified application, for example the identified most likely matching application from 208 or, in the case of a collision, the selected application from 210. Orchestrator 110 can launch the application and/or cause client 10 to launch the application locally or at a remote server so that it is accessible to the user through the UI. In at least some embodiments, the launching can include loading context data from the UI into the most likely matching application. For example, the most likely matching application may be launched in a state of being logged into a same account that is logged into the UI and/or may be launched with data previously entered into the UI being incorporated into at least one component of the most likely matching application.

Figure 3:
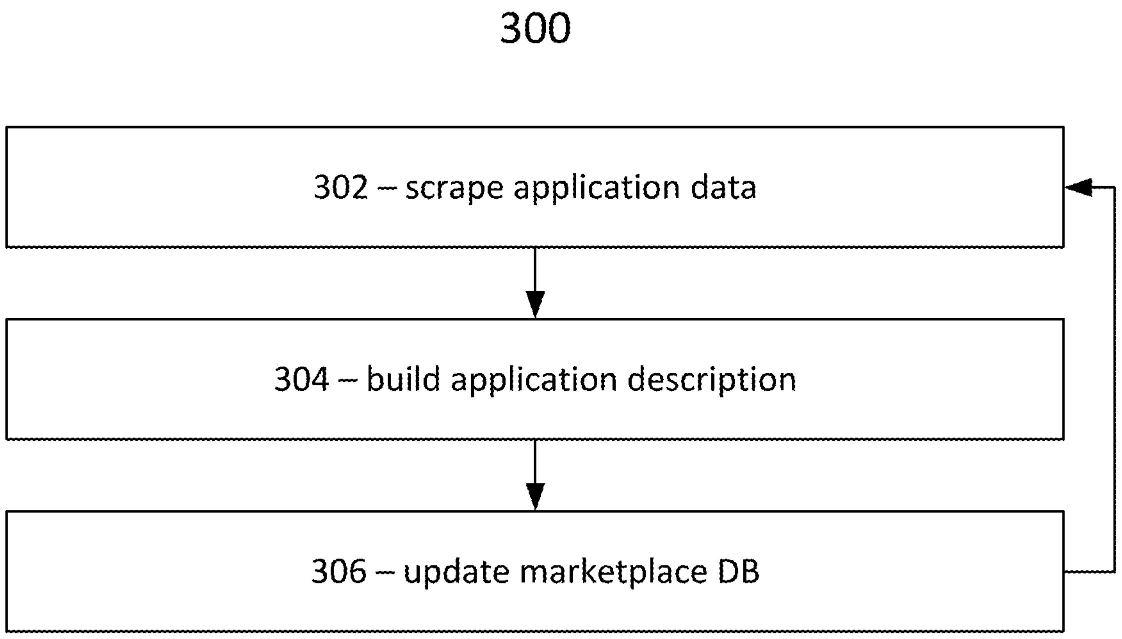
FIG. 3 shows an example database configuration process according to some embodiments of the disclosure.

FIG. 3 shows an example database configuration process 300 according to some embodiments of the disclosure. By performing process 300, system 100 can build and/or update marketplace DB 140, ensuring that the application options available to the user in response to the requests for computing functions are up-to-date and correctly targeted.

At 302, data indexer 150 can scrape or otherwise obtain data describing applications and/or components thereof. For example, applications and/or components thereof may have some or all of their data stored by a storage such as a cloud object storage service (e.g., Amazon Simple Storage Service (S3)) or the like. Data indexer 150 and/or other services may scrape data from such storage (e.g., periodically and/or as a scheduled operation).

At 304, data indexer 150 can build application description (s) from the data scraped at 302. For example, data indexer 150 and/or other services may build vectors from the scraped data. In at least some embodiments this may include building a vector per chunk of scraped data according to a predetermined chunk size, or according to another vector generation scheme.

At 306, data indexer 150 can add description(s) from 304 to marketplace DB 140. For example, data indexer and/or other services may store the vectors built at 304 in marketplace DB 140. Marketplace DB 140 may ingest the vectors and, when the ingestion is complete, indicate that the new data is queryable. At this point, marketplace DB 140 may be ready for use in process 200 and/or other processes, with newly scraped or otherwise obtained data available for querying.

Figure 4:
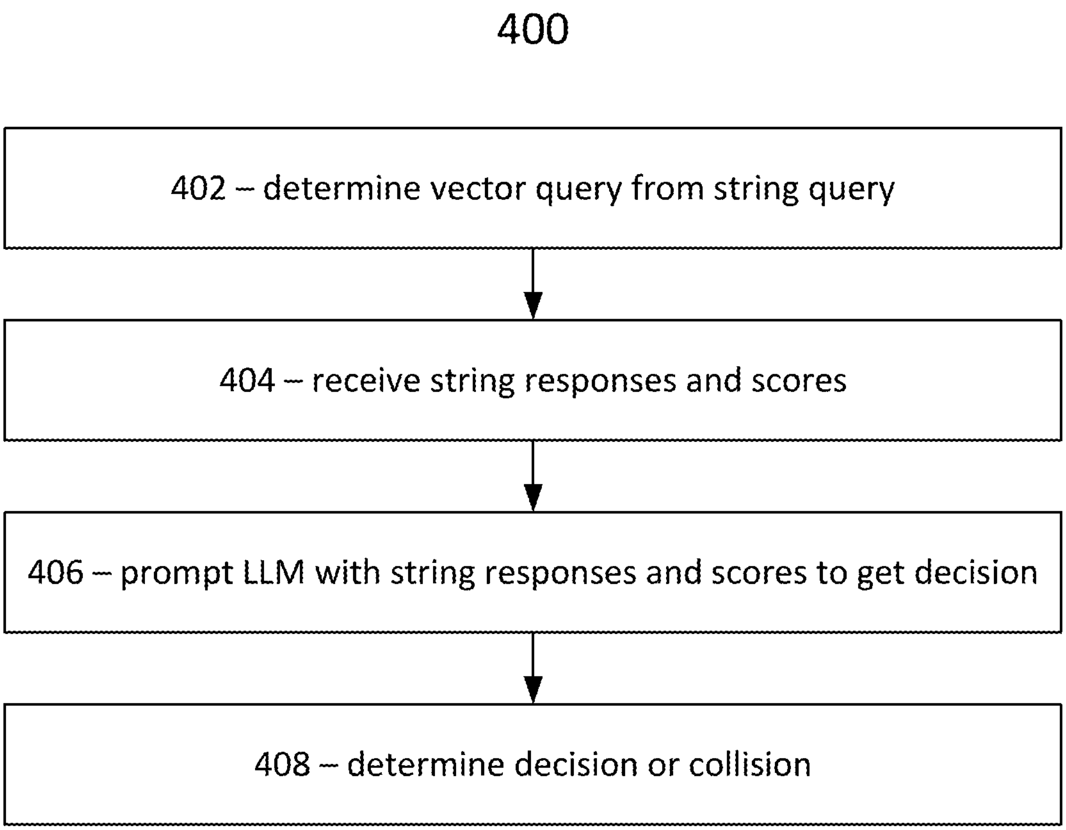
FIG. 4 shows an example resource identification process according to some embodiments of the disclosure.

FIG. 4 shows an example resource identification process 400 according to some embodiments of the disclosure. Process 400 is an example implementation of 204-208 in process 200 described above, presented to illustrate how resources can be identified based on the user's request. Process 400 is an example wherein a query to marketplace DB 140 returns multiple potential matches to the user's request, and system 100 uses GenAI 20 as a decision maker to identify one or a small number of matches as appropriate to load in response to the user's request.

At 402, embeddings handler 130 can determine a query for marketplace DB 140 based on the string query originating with the user as described above with respect to process 200. For example, the user's request may include text entered into a UI such as "How do I file my taxes?" Embeddings handler may produce a query including and/or otherwise using the request string itself (e.g., "How do I file my taxes?") and, in at least some embodiments, context data such as previous user query/UI chat history data, context data indicating a UI state and/or other UI data at the time the text was entered, etc. Marketplace DB 140 may be queried using the query as described above.

At 404, embeddings handler 130 can receive string responses and scores from marketplace DB 140 in response to the query generated at 402. For example, marketplace DB 140 may process the query and return a plurality of string responses of potentially matching entries. In at least some embodiments, marketplace DB 140 searching algorithms may use K-nearest neighbor or other classifiers to return multiple possible matches along with confidence scores for likelihood of match. In some cases, confidence scores generated in this manner may be close to one another, so that additional processing (e.g., GenAI 20) may help further differentiate the results. For example, marketplace DB 140 may return "TurboTax, confidence 0.92" and "SlowTax, confidence 0.91" in response to the query from 402.

At 406, LLM handler 160 can prompt GenAI 20 with string responses and scores from 404 to get a decision of which application to load. GenAI 20 may be used as a decision maker because scores obtained at 404 can often be very similar to one another, as they may represent vector matches without more nuanced information. For example, in some embodiments the prompt may include the user's initial string (e.g., "How do I file my taxes?") and context data, responses from marketplace DB 140 (e.g., "TurboTax, confidence 0.92" and "SlowTax, confidence 0.91"), and a prompt asking GenAI 20 to identify which response is the best match for the initial string and context. GenAI 20 can evaluate the user's request against the string descriptions of the applications to select a best match.

At 408, LLM handler 160 can receive a response from GenAI 20. Embeddings handler 130 and/or LLM handler 160 may determine which application to load or determine a collision is present. As described above, system 100 can load the application indicated in the GenAI 20 response (e.g., if GenAI 20 replies with "TurboTax") or, if the GenAI 20 response indicates a collision (e.g., if GenAI 20 replies with "both TurboTax and SlowTax are good choices" or the like), prompt the user for a selection.

Figure 5:
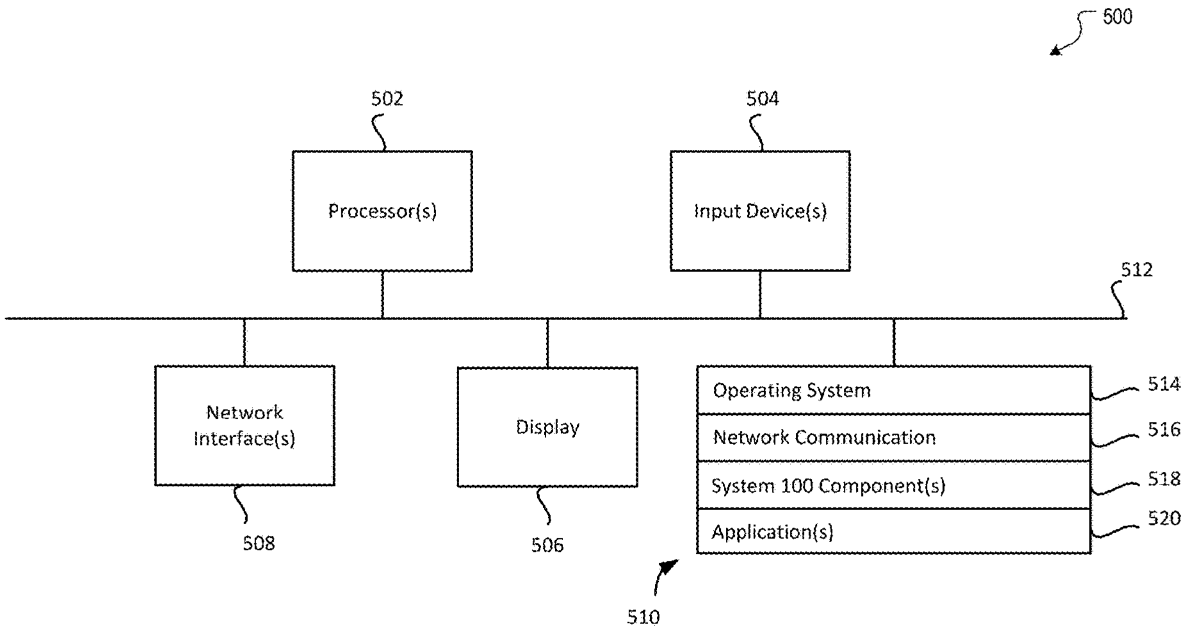
FIG. 5 shows an example computing device according to some embodiments of the disclosure.

FIG. 5 shows a computing device 500 according to some embodiments of the disclosure. For example, computing device 500 may function as system 100 and/or any portion (s) thereof, or multiple computing devices 500 may function as system 100 and/or any portion(s) thereof.

Computing device 500 may be implemented on any electronic device that runs software applications derived from compiled instructions, including without limitation personal computers, servers, smart phones, media players, electronic tablets, game consoles, email devices, etc. In some implementations, computing device 500 may include one or more processors 502, one or more input devices 504, one or more display devices 506, one or more network interfaces 508, and one or more computer-readable mediums 510. Each of these components may be coupled by bus 512, and in some embodiments, these components may be distributed among multiple physical locations and coupled by a network.

Display device 506 may be any known display technology, including but not limited to display devices using Liquid Crystal Display (LCD) or Light Emitting Diode (LED) technology. Processor(s) 502 may use any known processor technology, including but not limited to graphics processors and multi-core processors. Input device 504 may be any known input device technology, including but not limited to a keyboard (including a virtual keyboard), mouse, track ball, and touch-sensitive pad or display. Bus 512 may be any known internal or external bus technology, including but not limited to ISA, EISA, PCI, PCI Express, NuBus, USB, Serial ATA or FireWire. In some embodiments, some or all devices shown as coupled by bus 512 may not be coupled to one another by a physical bus, but by a network connection, for example. Computer-readable medium 510 may be any medium that participates in providing instructions to processor(s) 502 for execution, including without limitation, non-volatile storage media (e.g., optical disks, magnetic disks, flash drives, etc.), or volatile media (e.g., SDRAM, ROM, etc.).

Computer-readable medium 510 may include various instructions 514 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 504; sending output to display device 506; keeping track of files and directories on computer-readable medium 510; controlling peripheral devices (e.g., disk drives, printers, etc.) which can be controlled directly or through an I/O controller; and managing traffic on bus 512. Network communications instructions 516 may establish and maintain network connections (e.g., software for implementing communication protocols, such as TCP/IP, HTTP, Ethernet, telephony, etc.).

System 100 components 518 may include instructions for performing the processing described herein. For example, system 100 components 518 may provide instructions for performing any and/or all of processes 200-400, and/or other processing as described above. Application(s) 520 may be an application that uses or implements the outcome of processes described herein and/or other processes. In some embodiments, the various processes may also be implemented in operating system 514.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In some cases, instructions, as a whole or in part, may be in the form of prompts given to a large language model or other machine learning and/or artificial intelligence system. As those of ordinary skill in the art will appreciate, instructions in the form of prompts configure the system being prompted to perform a certain task programmatically. Even if the program is non-deterministic in nature, it is still a program being executed by a machine. As such, "prompt engineering" to configure prompts to achieve a desired computing result is considered herein as a form of implementing the described features by a computer program.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:

receiving, by at least one processor, a string input through a user interface (UI) and including a request to perform a computing function;

determining, by the at least one processor, a search query responsive to the request;

querying, by the at least one processor, at least one database using the search query;

receiving, by the at least one processor, a plurality of descriptions of a plurality of potentially matching applications and respective similarity scores for each respective one of the plurality of potentially matching applications in response to the querying;

prompting, by the at least one processor, a generative artificial intelligence (GenAI) with a prompt including the plurality of descriptions and respective similarity scores;

receiving, by the at least one processor, a response to the prompt from the GenAI indicating a most likely matching application from among the plurality of potentially matching applications; and launching, by the at least one processor, the most likely matching application in the UI, the launching including loading context data from the UI into the most likely matching application, wherein loading the context data comprises launching the most likely matching application in a state of being logged into a same account that is logged into the UI.

2. The method of claim 1, wherein:

the at least one database comprises at least one vector database;

determining the search query comprises determining at least one vector embedding of at least a portion of the string input; and querying the at least one database comprises searching the at least one vector database using the at least one vector embedding.

3. The method of claim 2, wherein receiving the plurality of potentially matching applications and respective similarity scores comprises determining at least one string including the plurality of potentially matching applications and respective similarity scores derived from at least one vector returned by the at least one vector database in response to the querying.

4. The method of claim 1, wherein:

the search query comprises a natural language description of the computing function; and each respective one of the plurality of descriptions comprises at least one feature of the respective potentially matching application.

5. The method of claim 1, further comprising:

scraping, by the at least one processor, the plurality of descriptions from at least one data source; and storing, by the at least one processor, the plurality of descriptions scraped from the at least one data source in the at least one database.

6. The method of claim 1, wherein loading the context data further comprises incorporating data previously entered into the UI into at least one component of the most likely matching application.

7. The method of claim 1, wherein the response to the prompt further includes a second most likely matching application from among the plurality of potentially matching applications, the method further comprising:

presenting, by the at least one processor, an interface within the UI indicating the most likely matching application and the second most likely matching application; and receiving, by the at least one processor, a selection of the most likely matching application from the user through the UI, wherein the launching is performed in response to the selection.

8. A system comprising:

at least one processor; and at least one non-transitory computer readable medium storing instructions that, when executed by the at least one processor, cause the at least one processor to perform processing comprising:

receiving a string input through a user interface (UI) and including a request to perform a computing function;

determining a search query responsive to the request;

querying at least one database using the search query;

receiving a plurality of descriptions of a plurality of potentially matching applications and respective similarity scores for each respective one of the plurality of potentially matching applications in response to the querying;

prompting a generative artificial intelligence (GenAI) with a prompt including the plurality of descriptions and respective similarity scores;

receiving a response to the prompt from the GenAI indicating a most likely matching application from among the plurality of potentially matching applications; and launching the most likely matching application in the UI, the launching including loading context data from the UI into the most likely matching application, wherein loading the context data comprises launching the most likely matching application in a state of being logged into a same account that is logged into the UI.

9. The system of claim 8, wherein:

the at least one database comprises at least one vector database;

determining the search query comprises determining at least one vector embedding of at least a portion of the string input; and querying the at least one database comprises searching the at least one vector database using the at least one vector embedding.

10. The system of claim 9, wherein receiving the plurality of potentially matching applications and respective similarity scores comprises determining at least one string including the plurality of potentially matching applications and respective similarity scores derived from at least one vector returned by the at least one vector database in response to the querying.

11. The system of claim 8, wherein:

the search query comprises a natural language description of the computing function; and each respective one of the plurality of descriptions comprises at least one feature of the respective potentially matching application.

12. The system of claim 8, wherein the instructions further cause the at least one processor to perform processing comprising:

scraping the plurality of descriptions from at least one data source; and storing the plurality of descriptions scraped from the at least one data source in the at least one database.

13. The system of claim 8, wherein loading the context data further comprises incorporating data previously entered into the UI into at least one component of the most likely matching application.

14. The system of claim 8, wherein the response to the prompt further includes a second most likely matching application from among the plurality of potentially matching applications, the instructions further causing the at least one processor to perform processing comprising:

presenting an interface within the UI indicating the most likely matching application and the second most likely matching application; and receiving a selection of the most likely matching application from the user through the UI, wherein the launching is performed in response to the selection.

15. A method comprising:

processing, by at least one processor, a user login to a computing platform including a UI, wherein the computing platform maintains context data associated with the user;

receiving, by at least one processor, a string input through the UI and including a request to perform a computing function;

determining, by the at least one processor, a search query responsive to the request;

querying, by the at least one processor, at least one database using the search query;

receiving, by the at least one processor, a plurality of descriptions of a plurality of potentially matching applications available within the computing platform and respective similarity scores for each respective one of the plurality of potentially matching applications in response to the querying;

prompting, by the at least one processor, a generative artificial intelligence (GenAI) with a prompt including the plurality of descriptions and respective similarity scores;

receiving, by the at least one processor, a response to the prompt from the GenAI indicating a most likely matching application from among the plurality of potentially matching applications; and launching, by the at least one processor, the most likely matching application in the UI in accordance with the context data, the launching comprising launching the most likely matching application in a state of being logged into a same account that is logged into the UI.

16. The method of claim 15, wherein:

the search query comprises a natural language description of the computing function; and each respective one of the plurality of descriptions comprises at least one feature of the respective potentially matching application.

17. The method of claim 15, further comprising:

scraping, by the at least one processor, the plurality of descriptions from at least one data source; and storing, by the at least one processor, the plurality of descriptions scraped from the at least one data source in the at least one database.

18. The method of claim 15, wherein the response to the prompt further includes a second most likely matching application from among the plurality of potentially matching applications, the method further comprising:

presenting, by the at least one processor, an interface within the UI indicating the most likely matching application and the second most likely matching application; and receiving, by the at least one processor, a selection of the most likely matching application from the user through the UI, wherein the launching is performed in response to the selection.

* * * * *